US006731433B2

(12) United States Patent
Jacobsen et al.

(10) Patent No.: US 6,731,433 B2
(45) Date of Patent: May 4, 2004

(54) DEVICE FOR GENERATING LIGHT SIGNALS

(75) Inventors: Wolfgang Jacobsen, Biscarrosse (FR); Ralf Neigl, Yorktown Heights, NY (US); Horst Berneth, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 127 days.

(21) Appl. No.: 10/017,155

(22) Filed: Dec. 13, 2001

(65) Prior Publication Data

US 2002/0113561 A1 Aug. 22, 2002

(30) Foreign Application Priority Data

Dec. 18, 2000 (DE) ........................................ 100 63 180

(51) Int. Cl.[7] ................................................ G02B 13/20

(52) U.S. Cl. ........................ 359/599; 359/606; 359/614

(58) Field of Search ................................ 359/599, 606, 359/614, 884, 265, 267, 275; 313/420, 421, 110, 111, 113, 114, 115, 116

(56) References Cited

U.S. PATENT DOCUMENTS

| | | | | | |
|---|---|---|---|---|---|
| 3,800,137 | A | * | 3/1974 | Fredell | 362/331 |
| 3,968,395 | A | | 7/1976 | Obermaier | 315/65 |
| 4,104,562 | A | | 8/1978 | DiCola | 315/158 |
| 4,293,796 | A | | 10/1981 | McMorrow | 315/205 |
| 4,902,108 | A | | 2/1990 | Byker | 350/357 |
| 5,659,423 | A | * | 8/1997 | Schierbeek et al. | 359/604 |
| 5,898,389 | A | | 4/1999 | Deese et al. | 340/907 |
| 5,995,181 | A | | 11/1999 | Imoto | 349/100 |
| 6,241,916 | B1 | | 6/2001 | Claussen et al. | 252/583 |
| 6,277,307 | B1 | | 8/2001 | Berneth et al. | 252/583 |
| 6,348,995 | B1 | * | 2/2002 | Hansen et al. | 359/486 |
| 6,474,845 | B1 | * | 11/2002 | Mabe et al. | 362/296 |

FOREIGN PATENT DOCUMENTS

| | | |
|---|---|---|
| WO | 00/58418 | 10/2000 |

OTHER PUBLICATIONS

Colour Physics for Industry, Roderich McDonald ed., Society of Dyes & Colorists (Month Unavailable) 1987, Chapter 3, Colorimetry and CIE system, Bryan Rigg, pp. 63–95.

Colour Physics for Industry, Roderich McDonald ed., Society of Dyes & Colorists (Month Unavailable) 1987, Chapter 4, Colour space, colour scales and colour differences, Keith McLaren, pp. 97–115.

* cited by examiner

*Primary Examiner*—Mohammad Sikder
(74) *Attorney, Agent, or Firm*—Godfried R. Akorli; Diderico van Eyl

(57) ABSTRACT

The present invention relates to a device for generating light signals, in particular traffic lights. The device according to the invention contains a housing with at least one opening, which is closed by a plate, the absorption of which can be controlled electrically, there being located in the interior of the housing behind the opening a diffuser element, which reflects incident light through the plate. Preferred switched states of the plate are either black (absorption over the entire spectral region of visible light) and colored transparent (slight absorption in specific spectral regions) or transparent (no absorption over the entire spectral region of visible light). The device according to the invention is used to generate light signals by virtue of the fact that the ambient light strikes the plate and, depending on switched state, is absorbed entirely, partially or not at all by the plate. The light fraction transmitted through the plate is reflected by the diffuser plate located behind the plate and transmitted a second time through the plate, and can then be perceived from outside.

24 Claims, 1 Drawing Sheet

DEVICE FOR GENERATING LIGHT SIGNALS

BACKGROUND

The present invention relates to a device for generating light signals.

A great number of devices for generating light signals are used world-wide, for example, for traffic control as traffic lights, and exclusively using the same basic principle: the switchable surfaces of different color, for example red, yellow and green, are generated by mounting in each case at least one active, intensely radiating light source behind a correspondingly colored filter disc. The surfaces respectively switched shine in the corresponding color, while the non-switched surfaces remain dark.

This concept has a number of defects:

- The light sources used have to be extremely bright so that the switched surfaces can be distinguished from the non-switched ones reliably even in bright daylight. The necessary requirement for electric power is correspondingly high.
- Despite these very bright light sources, the problem of certain distinguishability is not completely and reliably solved: in the case of direct, virtually perpendicular solar irradiation onto the lights, that is to say, the low morning or evening sun, the brightness of the (additionally) actively illuminated surface cannot be distinguished from the remaining surfaces illuminated only by the sun.
- The extreme brightness, mandatory for distinguishability during the day, of the light sources, is much too high at night and leads to dazzling of the car driver, particularly in the case of traffic lights which are set up outside built-up areas on unlit streets.
- Intensive light sources must be changed frequently, since they have only a limited service life. Moreover, the individual service life fluctuates greatly from specimen to specimen, and no warning of the imminent total failure of the light source is generally given. The functional reliability of the lights can be raised only with an increased outlay on maintenance and material consumption.

These disadvantages are generally known. Recent inventions relating to traffic lights are therefore concerned with one or more of these disadvantages. U.S. Pat. Nos. 4,293,796 and 4,104,562 disclose electronic methods and devices for reducing the lamp brightness at night. U.S. Pat. No. 3,968,395 discloses the use of two-filament lamps in traffic lights with the aim of raising the functional reliability. U.S. Pat. No. 5,898,389 discloses a method and a device for automatically switching over to battery operation in the event of failure of the external power supply.

The object according to the invention is to provide a device for generating light signals which, firstly, can be read correctly in all environmental conditions and, secondly, requires little maintenance and energy and is cost-effective.

The object according to the invention is achieved by means of a device containing a housing with at least one opening, which is closed by a plate, the absorption of which can be controlled electrically, there being located in the interior of the housing behind the opening a diffuser element, which reflects incident light through the plate.

SUMMARY OF THE INVENTION

As such, the invention relates to a device for generating light signals comprising: (a) a housing having an interior and at least one opening, (b) at least one plate having an absorption that is electrically controllable and closing the at least one opening, and (c) a diffuser element for reflecting incident light through the plate and located in the interior of the housing behind the at least one opening.

DESCRIPTION OF THE FIGURES

These and other features, aspects, and advantages of the present invention will become better understood with reference to the following description and appended claims, where

DESCRIPTION OF THE INVENTION

Figure 1A:
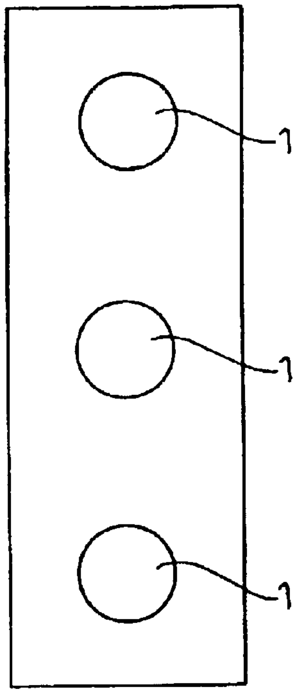
FIG. 1*a* is a top view of the device according to the invention, designed as traffic lights.

Preferred switched states of the plate are either black (absorption over the entire spectral region of visible light) and colored transparent (slight absorption in specific spectral regions) or transparent (no absorption over the entire spectral region of visible light).

The device according to the invention is used to generate light signals by virtue of the fact that the ambient light strikes the plate and, depending on switched state, light is absorbed entirely, partially or not at all by the plate. The light fraction transmitted through the plate is reflected by the diffuser plate located behind the plate and transmitted a second time through the plate.

The plate appears black when scarcely any light is transmitted, that is to say virtually all light is absorbed (neglecting the component which is reflected at the surface of the plate).

The plate appears white when virtually all light is transmitted (neglecting the component which is reflected at the surface of the plate), that is to say scarcely any light is absorbed.

The plate appears colored when a specific spectral region of the light is selectively absorbed or transmitted by the plate. The brightness depends in this case on the quantity of absorbed light, the coloration on the absorption spectrum of the plate. In the transparent state, the plate appears white from outside, since the ambient light is simply reflected by the diffuser.

The ambient light consists during the day of direct or indirect sunlight, and at dusk and night chiefly of artificial light sources such as street lighting, vehicle headlamps.

In an embodiment of the device according to the invention, the housing has three round openings which are arranged one above another and are respectively closed by a plate, it being possible for the plates to be switched electronically between the switched states of colored transparent and black, and the absorption spectrum of the uppermost plate permitting only the transmission of red light (absorption of light from all other spectral regions), the middle plate permitting only the transmission of red and green (=yellow) light, and the lower plate permitting only the transmission of green light.

The dimensions of the housing depend from the dimensions of the plates. The minimum dimensions are such that all plates can be included in the front plate of the housing. Normally such housings are made from metal or plastic.

The dimensions of the plates are generally 5 to 50 cm in diameter, if the plate has the shape of a circle, or 5 to 50 cm length and height, if the plate is squaric or rectangular. Preferred is a diameter or length/height of 10 to 30 cm.

In other embodiments, the housing has two or more round or else triangular or polygonal openings which are arranged one above another, next to one another or in a different arbitrary form relative to one another, which are closed in each case by a plate, it being possible to switch the plates electronically between the switched states of colored transparent and black, the absorption spectrum of the individual plates permitting only the transmission of red light (absorption of light from all other spectral regions) or of green and red (=yellow) light or of green light. The arrangement of the plates with differently colored switched states relative to one another is fundamentally arbitrary and is governed by the requirements for the desired signalling. The plates can be attached to the housing by usual means, e.g. by screws, rivets, clamps, adhesives or by squeezing. Thus, in addition to traffic lights for road traffic, it is also possible to produce such lights for pedestrians and signals for ships, trains and aircraft. Such signals can also flash and/or display symbols or signs (for example pedestrian symbol or cyclist symbol).

The reflectance of the diffuser is preferably above 30%, with particular preference above 70% of the quantity of light incident on the diffuser. The reflection preferably takes place diffusely. That is to say, even in the case of directional illumination for example, in the case of direct solar irradiation, the retroreflected light is distributed to a certain extent uniformly over all solid angle ranges. This ensures that the plates can be detected and their switched states can be distinguished when viewed from any direction.

It is also possible to fit an additional diffuser element on the outside of the housing in front of the plates. This diffuser element can be, for example, a glass plate which is coated with a layer which is strongly scattering, but only weakly absorbing.

The housing is preferably colored differently outside, at least in the region around the openings, from the plates in their switched states, preferably in black or white. If one of the switched states of the plates is black, the surrounding surface of the openings is preferably white, and if one of the switched states of the plates is transparent (plate appears white) the surrounding surface of the openings is preferably black. The plates can be effectively detected against the surrounding surface in both switched states in this way.

For the case in which only very little ambient light is present, for example at night in entirely unlit streets, it is possible to arrange additionally per plate in the housing of the device according to the invention at least one switchable active light source which illuminates the plate from inside. This additional light source is preferably arranged behind the diffuser element when seen from the plate outwards, and it is particularly preferred for the diffuser element to have a transmittance in the range from 5% to 30%.

In order further to improve the detectability of the plates and the distinguishability of their switched states for the case that the illumination is due predominantly to the headlamps of oncoming vehicles, it is advantageous for the reflection at the diffuser element to be partially of a retroreflective nature, that is to say a portion of the irradiated light is retroreflected into the same direction from which it was irradiated. As a result, the plates are lit up particularly brightly for the occupants of the vehicle illuminating the device according to the invention. In order for this additional function to act satisfactorily for night operation, the retro-reflective component of the reflected light should be higher than 5%, preferably higher than 20%. In order, in the event of direct sunlight, not to impair the detectability in this embodiment to an impermissible extent, however, a portion of at least 20%, with particular preference in the range from 30% to 70%, of the light irradiated onto the diffuser should, however, be diffusely reflected.

In a further embodiment of the invention, the plates are likewise switched between a switched state of high and low absorption, the precise coloring resulting, however, from an additional element with prescribed spectral absorption, such as a filter disc, which is arranged in, or outside on, the housing in the beam path of the light. The absorption spectrum of the plates is selected such that, in the switched state of low absorption, the absorption of the plate is as low as possible in the transmission range of the filter disc, preferably below 20%, referred to the quantity of incident light.

In the switched state of high absorption, the absorption in the transmission range of the filter disc should be above 70%, with particular preference above 90%, referred to the quantity of incident light.

In a further embodiment of the invention, one or more photoreceivers are arranged in the interior of the housing such that they detect a portion of the ambient light incident through the plate.

The signal from the photoreceiver can be used in a control unit as a trigger for switching the active light source on and off.

It can be checked whether the active light source must be switched on by executing one or more measurements with the aid of the photodetector in a time interval t after switching over the appropriate plate to an optically transparent state. The active light source can be switched on or not for the duration of the optically transparent state independently of whether the measured signal overshoots or undershoots a specific threshold value. The duration of the measurements with the aid of the detector preferably lasts no longer than one second.

The signal from the photoreceiver, or a plurality thereof, can also be used to provide an alarm signal via a control unit when the current switching response of the plate, and thus the functional reliability of the traffic lights are no longer ensured.

For the case in which colored filter glasses are used, and the plate switches only between a state of low and high absorption, the switching response of the plate is determined by a comparison of the signals in the two states. As soon as the ratio of these two signals has decreased by a specific percentage by comparison with the desired value determined once, an alarm signal is provided which indicates the need to maintain the device.

For the case in which both the transparency and the coloring of the plate are determined by the plate itself, use is made of a photoreceiver unit which detects only in a narrow spectral range, preferably in the spectral range in which the characteristic color of the plate lies, and the photoreceiver signal is compared between the two switched states of high and low absorption. As soon as the ratio of the two signals has decreased by a specific percentage by comparison with the desired value determined once, an alarm signal can be provided which indicates the need to maintain the apparatus.

In a preferred embodiment of the invention, the plate with variable optical absorption is formed by an electrochromic device known per se.

The electrochromic device contains a pair of glass or plastic discs which are provided in each case on one side with an electrically conductive coating, for example indium-tin-oxide (ITO). Both discs are transparent. These discs are used to construct a cell by connecting, preferably bonding, them with their mutually facing sides, coated in an electrically conductive fashion, to an annular or rectangular sealing ring. The sealing ring produces a uniform spacing between the discs of, for example, 0.01 to 0.5 mm. This cell is filled with an electrochromic medium. Contact may be made with the two discs separately via the electrically conductive layers.

The electrochromic device according to the invention contains an electrochromic medium which is a solution of a gel or a polymer. Such a medium can be filled easily into an electrochromic cell.

The electrochromic medium contains a mixture of electrochromic compounds which, upon the application of a voltage, causes a neutral grey coloration which is as uniform as possible, or effects another, arbitrary coloration such as, for example, a red coloration of the image. The transmission of the electrochromic layer in the visible region can be varied by varying the strength of the applied voltage.

If there is no voltage between the two electrically conductive layers, the electrochromic plate is transparent and preferably has a transmission which is greater than 70%. The minimal transmission in the event of coloration is less than 25%.

Known as electrochromic medium from DE 19 605 451 and DE 19 605 448 are electrochromic systems which usually contain pairs of redox substances which are dissolved in an inert solvent. In addition, electrolyte salts, light stabilizers (UV stabilizers) and substances which influence the viscosity can also be contained. As a pair of electrochromic substances, use is made in each case of one reducible substance and one oxidizable substance. Each substance is colorless or only slightly colored in the base state. Under the action of an electric potential, one substance is reduced and the other is oxidized, with at least one becoming colored. After switching off the potential, both substances revert to the base state, with decoloration or lightening of color occurring.

$$RED_1 + OX_2 \rightleftharpoons OX_1 + RED_2$$

(colorless) (low energy pair) — (colored) (high energy pair)

It is known from U.S. Pat. No. 4,902,108 that suitable pairs of redox substances are those whose reducible substance has at least two chemically reversible reduction waves in the cyclic voltamogram and the oxidizable substance correspondingly has at least two chemically reversible oxidation waves.

The electrochromic systems from DE 19 605 448 and DE 19 605 451 contain at least one oxidizable substance $RED_1$ which, by releasing electrons at an anode, is converted from a weakly colored or colorless form into a colored form $OX_1$ and at least one reducible substance $OX_2$ which, by accepting electrons at the cathode, is converted from a weakly colored or colorless form into a colored form $RED_2$, in each case with an increase in extinction in the visible region of the spectrum, the weakly colored or colorless form respectively being recovered after charge equalization, the reciprocal conversion of oxidized and reduced forms being performed by rupture or formation of a σ bond (DE 196 05 448), or at least one of the substances $RED_1$ and $OX_2$ contained being linked covalently to one another via a bridge.

The cell according to the invention preferably contains electrochromic media in which a) the reducible substance has at least one, preferably at least two chemically reversible reduction waves in the cyclic voltamogram, and the oxidizable substance correspondingly has at least one, preferably at least two chemically reversible oxidation waves, or
b) the reducible substance and the oxidizable substance are bonded to one another covalently via a bridge B or
c) the reducible and/or oxidizable substances are selected as those in which the reversible transition between the oxidizable form and the reducible form, or vice versa, is associated with the rupture or formation of a σ bond, or
d) the reducible substance and/or the oxidizable substance are/is metal salts or metal complexes from those metals which exist in at least two oxidation stages, or
e) the reducible substance and/or the oxidizable substance are/is oligomers and polymers which contain at least one of the said redox systems, or pairs of such redox systems such as are defined under a) to d), or
f) mixtures of the substances described in a) to e) are used as reducible and/or oxidizable substance, assuming that these mixtures contain at least one reducible and at least one oxidizable redox system.

Through selection of the electrochromic compounds $RED_1$ and $OX_2$ and/or mixtures thereof, any desired monochromic hues can be set. Grey shades can be set in a known manner by suitable mixing of trichromicity colors (Color Physics for Industry, Roderick McDonald, ed., Society of Dyers and Colorists, 1987 and WO 98/44383).

$OX_2$ and $RED_1$ which are suitable within the meaning of the invention are those substances which, when being reduced or oxidized at the cathode or anode, respectively, in the said solvent supply products $RED_2$ and $OX_1$ which do not participate in any subsequent chemical reaction, but can be oxidized or reduced completely again to $OX_2$ and $RED_1$.

Suitable reducible substances $OX_2$ and oxidizable substances $RED_1$ are named, for example, in WO 00/58418.

The method according to the invention permits the fabrication of devices for generating light signals for traffic control (traffic lights), which are entirely or predominantly free from the grave disadvantages, some of which have already been set forth, of the traffic lights corresponding to the prior art:

The switched plates of the device according to the invention can be reliably distinguished from the non-switched plates even in bright daylight.

The need for electric power is drastically reduced.

Even direct incidence of sunlight on the lights in no way influences the distinguishability of switched and non-switched plates.

The risk of road users being dazzled at night is reliably eliminated.

There is no longer any risk of a sudden, unforeseeable total failure of a set of lights in accordance with the device according to the invention.

Only the additional illumination for night operation can fail.

However, it is still possible in this case to distinguish between switched and non-switched plates, at least in the headlamp light of the respective vehicle.

Figures and Examples

The invention is explained in more detail by means of the following figures, as mentioned above, in which:

FIG. 1*a* shows a top view of the device according to the invention, designed as traffic lights.

Figure 1B:
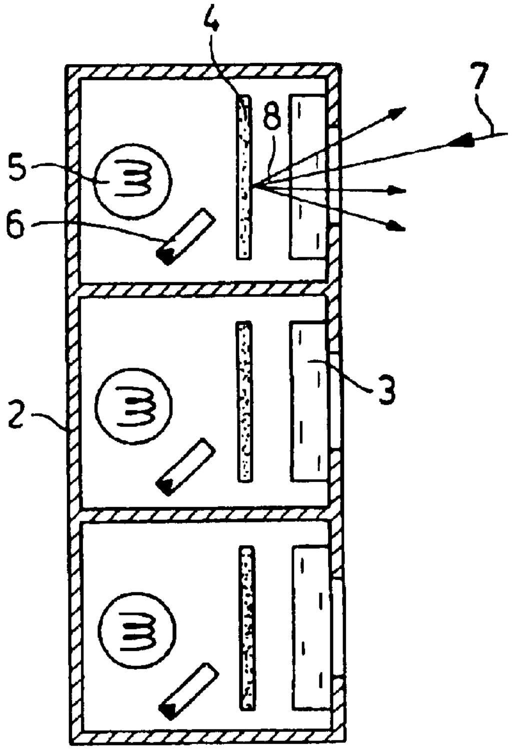
FIG. 1*b* is a longitudinal section through the device according to the invention, designed as traffic lights.

FIG. 1*b* shows a longitudinal section through the device according to the invention, designed as traffic lights.

FIG. 1 shows the essential constituents of traffic lights according to the invention. FIG. 1*a* illustrates the top view of the side, facing the traffic, of the traffic lights, with the plates 1, the brightness and/or coloration of which can be varied specifically. FIG. 1*b* shows the design of traffic lights according to the invention, in a longitudinal section. The housing 2 has openings 1 which can be closed by plates 3 whose optical absorption can be varied specifically. Located behind the plates 3 in each case is a diffuser element 4 which reflects light incident through the plate. An active light source 5 and a photoreceiver 6 are arranged behind the diffuser element 4.

If, now, ambient light 7 strikes one of the openings 1, its intensity and/or relative spectral composition in the associated plate 3 is varied. The light 8 transmitted through the plate 3 is partially retroreflected by the diffuser element 4 and once again traverses the plate 3, in which case its intensity and/or relative spectral composition is once again varied. Thereafter, it emerges from the plate 3 and can be perceived by the observer (road user) for the purpose of judging the brightness and color of the plate 3.

The additional active light source 5 illuminates the plate 3 through the diffuser element 4. A certain fraction of the light 8 falls onto the photoreceiver 6. The signals detected by the photoreceiver serve for the purpose of judging the intensity of the ambient light and the current switching response of the plate 3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for generating light signals comprising:

(a) a housing having an interior and at least one opening, (b) at least one plate having an absorption that is electrically controllable and closing the at least one opening, and (c) a diffuser element for reflecting incident light through the plate and located in the interior of the housing behind the at least one opening, wherein the housing has three round openings arranged one above another and each of which is, respectively, closed by a plate, so that it is possible for each plate to be switched electronically between the switched states of colored transparent and black, and the absorption spectrum of the uppermost plate permits only transmission of red light, the middle plate permitting only the transmission of red and green light and the lower plate permitting only the transmission of green light.

2. The device according to claim 1, wherein at least one switchable active light source is arranged in the housing for each plate and the source illuminates the plate from inside.

3. The device according to claim 2, wherein the active light source is arranged behind the diffuser element when seen from the plate outwards.

4. The device according to claim 3, wherein the diffuser element has a transmittance in the range from about 5% to about 30%.

5. The device according to claim 1, wherein filter discs are arranged in, or outside on, the housing in the beam path of the light, and the absorption spectrum of the plates is selected such that, in the switched state of low absorption, the absorption of the plate is as low as possible in the transmission range of the filter disc, and in the switched state of high absorption, the absorption in the transmission range of the filter disc is above 70%, referred to the quantity of incident light.

6. The device according to claim 1, wherein one or more photoreceivers are arranged in the interior of the housing such that they detect a portion of the ambient light incident through the plate.

7. The device according to claim 1, wherein the reflectance of the diffuser element, which is arranged in the interior of the housing, is above 30% of the quantity of light incident on the diffuser element.

8. The device according to claim 1, wherein the reflection at the diffuser element is partially retroreflective.

9. The device according to claim 8, wherein, the retroreflective component of the light reflected by the diffuser element is higher than 5%.

10. The device according to claim 8, wherein a component of at least 20%, with particular preference in the range from 30% to 70% of the light reflected by the diffuser element is diffusely reflected.

11. The device according to claim 1, wherein an additional diffuser element is fitted on the outside of the housing in front of the plate or plates.

12. The device according to claim 11, wherein the diffuser element is a glass plate which is coated with a layer which is strongly scattering and weakly absorbing.

13. The device according to claim 1 wherein the electric switched states of the plate are either black or colored transparent or transparent and colored transparent.

14. The device according to claim 1, wherein the housing is colored differently outside, at least in the region around the openings, from the plates in their switched states, and optionally in black or white.

15. The device according to claim 14, wherein the surrounding surface of the opening is white when one of the switched states of the associated plate is black, and in that the surrounding surface of the opening is black when one of the switched states of the plates is transparent.

16. The device according to claim 2, wherein the device is connected to a control unit, and this control unit switches off or switches in the active light source for the duration of the optically transparent state as a function of whether one or more signals measured with the aid of the photodetector in a prescribed time interval t after switching of the plate to an optically transparent state overshoots or undershoots a prescribed threshold value.

17. The device according to claim 16, wherein the prescribed time interval t is at most 1 second.

18. The device according to claim 16, wherein the device is connected to a control unit, and this control unit outputs an alarm signal when the ratio of the signals measured with the aid of one or more photoreceivers in the state of low and high absorption lies below a prescribed value.

19. The device according to claim 18, wherein use is made of a photoreceiver unit which detects only in a narrow spectral region, in which the characteristic color of the plates lies.

20. The device according to claim 1, wherein the plate or plurality of plates is/are electrochromic devices.

21. The device according to claim 20, wherein the electrochromic device comprises a pair of transparent glass or plastic discs which are provided in each case on one side with an electrically conductive, transparent coating and which are joined via a sealing ring on the sides of their conductive coating, and in the case of which the volume formed from the two discs and the sealing ring is filled with an electrochromic medium.

22. The device according to claim 21, wherein the electrochromic medium is a liquid, a gel or a polymer.

23. The device according to claim 22, wherein the electrochromic medium contains at least one pair of electrochromic and oxidizable or reducible substances $OX_2$ and $RED_1$.

24. The device according to claim 23, wherein an electrochromic medium is used wherein a) the reducible substance has at least one or at least two chemically reversible reduction waves in the cyclic voltammogram, and the oxidizable substance correspondingly has at least one or at least two chemically reversible oxidation waves, or b) the reducible substance and the oxidizable substance are bonded to one another covalently via a bridge or c) the reducible and/or oxidizable substances are selected as those in which the reversible transition between the oxidizable form and the reducible form, or vice versa, is associated with the rupture or formation of a σ bond, or d) the reducible substance and/or the oxidizable substance are/is metal salts or metal complexes from those metals which exist in at least two oxidation stages, or e) the reducible substance and/or the oxidizable substance are/is oligomers and polymers which contain at least one of the said redox systems, or pairs of such redox systems such as are defined under a) to d), or f) mixtures of the substances described in a) to e) are used as reducible and/or oxidizable substance, assuming that these mixtures contain at least one reducible and at least one oxidizable redox system.

* * * * *